United States Patent
Hang et al.

(10) Patent No.: US 10,827,477 B2
(45) Date of Patent: Nov. 3, 2020

(54) CONFIGURATION INFORMATION TRANSMISSION METHOD, APPARATUS, AND SYSTEM

(71) Applicant: HUAWEI TECHNOLOGIES CO., LTD., Guangdong (CN)

(72) Inventors: Haicun Hang, Shanghai (CN); Ye Wu, Shanghai (CN); Jin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 16/223,771

(22) Filed: Dec. 18, 2018

(65) Prior Publication Data

US 2019/0124633 A1 Apr. 25, 2019

Related U.S. Application Data

(63) Continuation of application No. PCT/CN2017/083638, filed on May 9, 2017.

(30) Foreign Application Priority Data

Jun. 21, 2016 (CN) .......................... 2016 1 0451932

(51) Int. Cl.
*H04W 72/04* (2009.01)
*H04L 5/00* (2006.01)

(52) U.S. Cl.
CPC ......... *H04W 72/042* (2013.01); *H04L 5/0037* (2013.01); *H04L 5/0057* (2013.01);
(Continued)

(58) Field of Classification Search
CPC ............. H04W 72/04; H04W 72/0446; H04W 72/0453; H04W 72/042; H04L 5/0016;
(Continued)

(56) References Cited

U.S. PATENT DOCUMENTS 9,179,448 B2 * 11/2015 Seo .................. H04L 1/0026
2013/0287047 A1 * 10/2013 Tanaka .............. H04L 1/1607
370/496
(Continued)

FOREIGN PATENT DOCUMENTS

CN 102378114 A 3/2012
CN 103458420 A 12/2013
(Continued)

OTHER PUBLICATIONS

International Search Report dated Jun. 30, 2017 in corresponding International Application No. PCT/CN2017/083638.
(Continued)

*Primary Examiner* — Phong La
(74) *Attorney, Agent, or Firm* — Kilpatrick Townsend & Stockton LLP

(57) ABSTRACT

This disclosure relates to the field of communications technologies, and discloses a configuration information transmission method, apparatus, and system. The method includes: determining, by a base station, configuration information corresponding to a target group, where the configuration information is used to indicate a CSI-RS configuration of UE in the target group, the target group includes at least two UEs, and CSI-RS configurations of all UEs in the target group are the same; and sending, by the base station in a first preset time-frequency resource area, the configuration information to the UE in the target group. This application resolves a problem of relatively high signaling overheads, thereby achieving an effect of reducing signaling overheads. This application is applied to configuration information transmission.

12 Claims, 7 Drawing Sheets

(52) U.S. Cl.
CPC ........... *H04L 5/0094* (2013.01); *H04W 72/04* (2013.01); *H04W 72/0446* (2013.01); *H04W 72/0453* (2013.01); *H04L 5/0016* (2013.01); *H04L 5/0053* (2013.01)

(58) Field of Classification Search
CPC ... H04L 5/0053; H04L 5/0057; H04L 5/0094; H04L 5/0037
USPC .......................................................... 370/329
See application file for complete search history.

(56) References Cited

U.S. PATENT DOCUMENTS

| | | | |
|---|---|---|---|
| 2015/0085805 A1 | 3/2015 | Li et al. | |
| 2015/0236801 A1* | 8/2015 | Sun ..................... | H04L 27/2613 370/328 |
| 2015/0257132 A1* | 9/2015 | Park ................... | H04W 72/042 370/329 |
| 2015/0312927 A1* | 10/2015 | Ko ....................... | H04L 5/0094 370/336 |
| 2016/0112177 A1* | 4/2016 | Zheng ................ | H04W 52/243 370/330 |
| 2016/0135143 A1* | 5/2016 | Won ....................... | H04W 4/06 370/312 |
| 2018/0054821 A1* | 2/2018 | Sun ...................... | H04W 72/042 |
| 2018/0220433 A1* | 8/2018 | Li .......................... | H04B 7/0626 |
| 2019/0053207 A1* | 2/2019 | Kim .................. | H04W 72/0446 |

FOREIGN PATENT DOCUMENTS

| | | |
|---|---|---|
| EP | 2858398 A1 | 4/2015 |
| EP | 2919506 A1 | 9/2015 |
| WO | 2013091366 A1 | 6/2013 |

OTHER PUBLICATIONS

R1-153880,Qualcomm Inc.:"Beamformed CSI-RS for support of FD-MIMO", 3GPP TSG-RAN WG1 #82, Aug. 24-28, 2015 (4 pages).
International Search Report dated Jun. 30, 2017 in corresponding International Patent Application No. PCT/CN2017/083638 (7 pages).
Written Opinion of the International Searching Authority dated Jun. 30, 2017 in corresponding International Patent Application No. PCT/CN2017/083638 (4 pages).

* cited by examiner

CONFIGURATION INFORMATION TRANSMISSION METHOD, APPARATUS, AND SYSTEM

CROSS-REFERENCE TO RELATED APPLICATIONS

This application is a continuation of International Application No. PCT/CN2017/083638, filed on May 9, 2017, which claims priority to Chinese Patent Application No. 201610451932.7, filed on Jun. 21, 2016. The disclosures of the aforementioned applications are hereby incorporated by reference in their entireties.

TECHNICAL FIELD

This disclosure relates to the field of communications technologies, and in particular, to a configuration information transmission method, apparatus, and system.

BACKGROUND

A Long Term Evolution (LTE) communications system may include user equipment (User Equipment, UE) and a base station that serves the UE. The base station may perform resource configuration on the UE by sending configuration information to the UE.

In a related technology, a base station may encapsulate configuration information into downlink control information (Downlink Control Information, DCI), and send the configuration information to UE by using a physical downlink control channel (Physical Downlink Control Channel, PDCCH), or may encapsulate configuration information into radio resource control (Radio Resource Control, RRC) signaling, and send the configuration information to UE by using a physical downlink shared channel (Physical Downlink Shared Channel, PDSCH).

In a process of implementing this application, the inventor finds that the related technology has at least the following problem: When the base station serves a relatively large quantity of UEs, the base station needs to send configuration information to each UE to perform resource configuration for each UE, and if configuration information of some UEs in the UEs served by the base station is the same, the base station needs to send same resource configuration information to each UE. Consequently, signaling overheads are relatively high.

SUMMARY

To resolve a problem of relatively high signaling overheads in a related technology, embodiments of the present invention provide a configuration information transmission method, apparatus, and system. The technical solutions are as follows:

According to a first aspect, a configuration information transmission method is provided, and the method includes:

determining, by a base station, configuration information corresponding to a target group, where the configuration information is used to indicate a channel state information-reference signal CSI-RS configuration of user equipment UE in the target group, the target group includes at least two UEs, and CSI-RS configurations of all UEs in the target group are the same; and sending, by the base station in a first preset time-frequency resource area, the configuration information to the UE in the target group.

In this embodiment of the present invention, each group is corresponding to one piece of configuration information. Therefore, the base station may determine the configuration information corresponding to the target group, and then send, in the first preset time-frequency resource area, the configuration information to the UE in the target group, where the configuration information corresponding to the target group is used to indicate the CSI-RS configuration of the UE in the target group. The target group includes at least two UEs, and the CSI-RS configurations of all the UEs in the target group are the same.

For example, the target group may be a group A, and configuration information corresponding to the group A may be configuration information a. Therefore, the base station may determine the configuration information a, and then send, in the first preset time-frequency resource area, the configuration information a to UE in the group A.

It should be noted that, in this embodiment of the present invention, the first preset time-frequency resource area may be on a PDSCH, or may be on a PDCCH, or may be on an enhanced physical downlink control channel (Enhanced physical downlink control channel, EPDCCH). This is not limited in this embodiment of the present invention. In this embodiment of the present invention, an example in which the first preset time-frequency resource area is on the PDSCH is used for description.

Optionally, the first preset time-frequency resource area is on a physical downlink shared channel PDSCH, and before the sending, by the base station in a first preset time-frequency resource area, the configuration information to the UE in the target group, the method further includes:

determining, by the base station, indication information, where the indication information is used to indicate a location of the first preset time-frequency resource area on the PDSCH;

obtaining, by the base station, a channel state information CSI radio network temporary identifier RNTI of the target group;

scrambling, by the base station, the indication information by using the CSI-RNTI of the target group; and sending, by the base station in a second preset time-frequency resource area on a physical downlink control channel PDCCH, scrambled indication information to the UE in the target group.

The base station may determine the indication information, obtain the CSI-RNTI of the target group, then scramble the indication information by using the CSI-RNTI of the target group to obtain the scrambled indication information, and finally send, in the second preset time-frequency resource area on the PDCCH, the scrambled indication information to the UE in the target group, where the indication information is used to indicate the location of the first preset time-frequency resource area on the PDSCH.

The indication information is further used to indicate a modulation and coding scheme of the UE, and the like. For example, the indication information may be indication information Z. The base station determines that a CSI-RNTI of a target group A may be an ID-A. The base station scrambles the indication information Z by using the ID-A to obtain scrambled indication information. The scrambled indication information may be Z1. Therefore, the base station sends, in the second preset time-frequency resource area on the PDCCH, the scrambled indication information Z1 to the UE in the target group.

Optionally, before the sending, by the base station in a second preset time-frequency resource area on a physical downlink control channel PDCCH, scrambled indication information to the UE in the target group, the method further includes: adding, by the base station, the CSI-RNTI of the target group to radio resource control RRC signaling, and sending the radio resource control RRC signaling to the UE in the target group.

The base station may encapsulate the CSI-RNTI of the target group into the RRC signaling, and then send the RRC signaling to the UE in the target group by using the PDSCH.

In this embodiment of the present invention, the base station may send corresponding RRC signaling to UE in each group in the m groups, and the m groups include the target group; or the base station may send RRC signaling only to the UE in the target group. This is not limited in this embodiment of the present invention.

For example, the target group may be a group A, and a CSI-RNTI of the target group A may be an ID-A. The base station may encapsulate the ID-A into RRC signaling, and then send the RRC signaling to UE in the target group A by using the PDSCH.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the sending, by the base station in a second preset time-frequency resource area on a physical downlink control channel PDCCH, scrambled indication information to the UE in the target group includes: sending, by the base station in the second preset time-frequency resource area in a target time period, the scrambled indication information to the UE in the target group, where the target time period is corresponding to the target group.

In this embodiment of the present invention, CSI-RNTIs of the m groups may be the same, or may be different. When the CSI-RNTIs of the m groups are different, the base station may send indication information scrambled by using a corresponding CSI-RNTI to UE in different groups in a same time period, or may send indication information scrambled by using a corresponding CSI-RNTI to UE in different groups in a same time period. When the CSI-RNTIs of the m groups are the same, if the base station sends indication information scrambled by using a same CSI-RNTI to UE in different groups in a same time period, UE in another group in the m groups except the target group can also detect the indication information. This results in a configuration information receiving error. Therefore, when the CSI-RNTIs of the m groups are the same, each group may be corresponding to a time period, and the CSI-RNTI is valid only for UE in a corresponding group in a corresponding time period. This can avoid a case of a configuration information receiving error. When sending configuration information to UE in the groups, the base station may send configuration information to UE in a corresponding group based on an emergency degree of the configuration information. A sequence of sending the configuration information may be in positive correlation with the emergency degree.

In this embodiment of the present invention, the base station may send, in the second preset time-frequency resource area in the target time period corresponding to the target group, the scrambled indication information to the UE in the group. For example, a time period corresponding to each group may be a transmission time interval (Transmission Time Interval, TTI), and the base station may send, in the second preset time-frequency resource area in a TTI corresponding to the target group, the scrambled indication information to the UE in the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, before the sending, by the base station in a second preset time-frequency resource area on a physical downlink control channel PDCCH, scrambled indication information to the UE in the target group, the method further includes: determining, by the base station, search space that includes a plurality of preset control channel elements CCEs on the PDCCH as the group search space.

In this embodiment of the present invention, search space on the PDCCH may include UE search space, common search space, and group search space, where the UE search space and the common search space are search space in the related technology, and the group search space is newly added search space in this application. The UE search space is used to carry DCI sent by the base station to UE. The DCI in the UE search space may be scrambled by using an RNTI of the UE. Therefore, the UE can detect corresponding DCI in the UE search space based on the RNTI of the UE. The common search space is used to carry common DCI sent by the base station, and the DCI in the common search space may be scrambled by using a common identifier of all UEs. Therefore, the UE can detect corresponding DCI in the common search space based on the common identifier of all UEs. The common identifier of all UEs may include but is not limited to a paging identifier, a transport format identifier, an uplink power control identifier, and the like. The group search space is the newly added search space in this application. The group search space is fixedly located on some control channel elements (Control Channel Element, CCE) of the PDCCH, and is used to carry DCI sent by the base station to a group. The DCI in the group search space may be scrambled by using a CSI-RNTI of the group. Therefore, the UE can detect corresponding DCI in the group search space based on the CSI-RNTI of the group. In this embodiment of the present invention, the second preset time-frequency resource area may be a time-frequency resource area in the common search space, or may be a time-frequency resource area in the group search space. When the second preset time-frequency resource area is the time-frequency resource area in the group search space, before sending, in the second preset time-frequency resource area on the PDCCH, the scrambled indication information to the UE in the target group, the base station may determine search space that includes a plurality of preset CCEs on the PDCCH as the group search space, and then send, in the second preset time-frequency resource area on the PDCCH, the scrambled indication information to the UE in the target group. For a process in which the base station determines the search space that includes a plurality of preset CCEs on the PDCCH as the group search space, refer to the related technology. This is not limited in this embodiment of the present invention. Based on a reserved value of an RNTI in a protocol of the related technology, when the second preset time-frequency resource area is the time-frequency resource area in the common search space, a value of a CSI-RNTI may be FFF4-FFFC (hexadecimal digits), or when the second preset time-frequency resource area is the time-frequency resource area in the group search space, a value of a CSI-RNTI may be 0000-FFFF (hexadecimal digits). In this embodiment of the present invention, the group search space is set to improve compatibility well.

According to a second aspect, a configuration information transmission method is provided, and the method includes:

receiving, by target user equipment UE in a first preset time-frequency resource area, configuration information sent by a base station, where the configuration information is sent, in the first preset time-frequency resource area, to UE in a target group after the base station determines configuration information corresponding to the target group, the target group includes at least two UEs, the configuration information is used to indicate a channel state information-reference signal CSI-RS configuration of the UE in the target group, CSI-RS configurations of all UEs in the target group are the same, and the target UE belongs to the target group; and receiving, by the target UE, a CSI-RS based on the configuration information, and performing channel estimation based on the received CSI-RS.

The target UE may receive, in the first preset time-frequency resource area, the configuration information sent by the base station, then receive the CSI-RS based on the configuration information, and perform the channel estimation based on the received CSI-RS, for example, the target UE estimates a status of a channel based on the CSI-RS.

Optionally, the first preset time-frequency resource area is on a physical downlink shared channel PDSCH, and before the receiving, by target UE in a first preset time-frequency resource area, configuration information sent by a base station, the method further includes:

receiving, by the target UE, radio resource control RRC signaling sent by the base station, where the RRC signaling carries a channel state information CSI radio network temporary identifier RNTI of the target group; and detecting, by the target UE based on the CSI-RNTI of the target group in a second preset time-frequency resource area on a physical downlink control channel PDCCH, scrambled indication information sent by the base station, where the scrambled indication information is obtained by using the CSI-RNTI of the target group to scramble indication information after the base station determines the indication information, and the indication information is used to indicate a location of the first preset time-frequency resource area on the PDSCH.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the detecting, by the target UE based on the CSI-RNTI of the target group in a second preset time-frequency resource area on a physical downlink control channel PDCCH, scrambled indication information sent by the base station includes:

detecting, by the target UE, the scrambled indication information based on the CSI-RNTI of the target group in the second preset time-frequency resource area in a target time period, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, after the detecting, by the target UE, the scrambled indication information based on the CSI-RNTI of the target group in the second preset time-frequency resource area in a target time period, the method further includes: marking, by the target UE after detection succeeds, the CSI-RNTI of the target group by using an invalid mark, where the invalid mark is used to indicate that the CSI-RNTI of the target group is invalid.

In this embodiment of the present invention, when the CSI-RNTIs of the m groups are the same, after successfully detecting the indication information, the target UE may mark the CSI-RNTI of the target group by using an invalid mark, where the invalid mark is used to indicate that the CSI-RNTI of the target group is invalid, so that another group can use the CSI-RNTI. Optionally, the target UE may delete or discard the CSI-RNTI of the target group, so that the CSI-RNTI of the target group is invalid for the target UE.

According to a third aspect, a base station is provided, and the base station includes:

a first determining module, configured to determine configuration information corresponding to a target group, where the configuration information is used to indicate a channel state information-reference signal CSI-RS configuration of user equipment UE in the target group, the target group includes at least two UEs, and CSI-RS configurations of all UEs in the target group are the same; and a first sending module, configured to send, in a first preset time-frequency resource area, the configuration information to the UE in the target group. Optionally, the first preset time-frequency resource area is on a physical downlink shared channel PDSCH, and the base station further includes:

a second determining module, configured to determine indication information, where the indication information is used to indicate a location of the first preset time-frequency resource area on the PDSCH;

an obtaining module, configured to obtain a channel state information CSI radio network temporary identifier RNTI of the target group;

a scrambling module, configured to scramble the indication information by using the CSI-RNTI of the target group; and a second sending module, configured to send, in a second preset time-frequency resource area on a physical downlink control channel PDCCH, scrambled indication information to the UE in the target group.

Optionally, the base station further includes: a third sending module, configured to add the CSI-RNTI of the target group to radio resource control RRC signaling, and send the radio resource control RRC signaling to the UE in the target group.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the second sending module is configured to send, in the second preset time-frequency resource area in a target time period, the scrambled indication information to the UE in the target group, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the base station further includes: a third determining module, configured to determine search space that includes a plurality of preset control channel elements CCEs on the PDCCH as the group search space.

According to a fourth aspect, target user equipment UE is provided, and the target UE includes:

a first receiving module, configured to receive, in a first preset time-frequency resource area, configuration information sent by a base station, where the configuration information is sent, in the first preset time-frequency resource area, to UE in a target group after the base station determines configuration information corresponding to the target group, the target group includes at least two UEs, the configuration information is used to indicate a channel state information-reference signal CSI-RS configuration of the UE in the target group, CSI-RS configurations of all UEs in the target group are the same, and the target UE belongs to the target group; and an estimation module, configured to: receive a CSI-RS based on the configuration information, and perform channel estimation based on the received CSI-RS.

Optionally, the first preset time-frequency resource area is on a physical downlink shared channel PDSCH, and the target UE further includes:

a second receiving module, configured to receive radio resource control RRC signaling sent by the base station, where the RRC signaling carries a channel state information CSI radio network temporary identifier RNTI of the target group; and a detection module, configured to detect, based on the CSI-RNTI of the target group in a second preset time-frequency resource area on a physical downlink control channel PDCCH, scrambled indication information sent by the base station, where the scrambled indication information is obtained by using the CSI-RNTI of the target group to scramble indication information after the base station determines the indication information, and the indication information is used to indicate a location of the first preset time-frequency resource area on the PDSCH.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the detection module is configured to detect the scrambled indication information based on the CSI-RNTI of the target group in the second preset time-frequency resource area in a target time period, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the target UE further includes: a marking module, configured to: after detection succeeds, mark the CSI-RNTI of the target group by using an invalid mark, where the invalid mark is used to indicate that the CSI-RNTI of the target group is invalid.

According to a fifth aspect, a base station is provided, the base station includes a processor and a transmitter, and the processor is coupled to the transmitter;

the processor is configured to determine configuration information corresponding to a target group, where the configuration information is used to indicate a channel state information-reference signal CSI-RS configuration of user equipment UE in the target group, the target group includes at least two UEs, and CSI-RS configurations of all UEs in the target group are the same; and the transmitter is configured to send, in a first preset time-frequency resource area, the configuration information to the UE in the target group.

Optionally, the first preset time-frequency resource area is on a physical downlink shared channel PDSCH, and the processor is further configured to:

determine indication information, where the indication information is used to indicate a location of the first preset time-frequency resource area on the PDSCH;

obtain a channel state information CSI radio network temporary identifier RNTI of the target group; and scramble the indication information by using the CSI-RNTI of the target group.

The transmitter is further configured to send, in a second preset time-frequency resource area on a physical downlink control channel PDCCH, scrambled indication information to the UE in the target group.

Optionally, the transmitter is further configured to add the CSI-RNTI of the target group to radio resource control RRC signaling, and send the radio resource control RRC signaling to the UE in the target group.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the transmitter is further configured to send, in the second preset time-frequency resource area in a target time period, the scrambled indication information to the UE in the target group, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the processor is further configured to determine search space that includes a plurality of preset control channel elements CCEs on the PDCCH as the group search space.

According to a sixth aspect, target user equipment UE is provided, the target UE includes a receiver and a processor, and the processor is coupled to the receiver;

the receiver is configured to receive, in a first preset time-frequency resource area, configuration information sent by a base station, where the configuration information is sent, in the first preset time-frequency resource area, to UE in a target group after the base station determines configuration information corresponding to the target group, the target group includes at least two UEs, the configuration information is used to indicate a channel state information-reference signal CSI-RS configuration of the UE in the target group, CSI-RS configurations of all UEs in the target group are the same, and the target UE belongs to the target group; and the processor is configured to: receive a CSI-RS based on the configuration information, and perform channel estimation based on the received CSI-RS.

Optionally, the first preset time-frequency resource area is on a physical downlink shared channel PDSCH, and the receiver is further configured to receive radio resource control RRC signaling sent by the base station, where the RRC signaling carries a channel state information CSI radio network temporary identifier RNTI of the target group; and the processor is configured to detect, based on the CSI-RNTI of the target group in a second preset time-frequency resource area on a physical downlink control channel PDCCH, scrambled indication information sent by the base station, where the scrambled indication information is obtained by using the CSI-RNTI of the target group to scramble indication information after the base station determines the indication information, and the indication information is used to indicate a location of the first preset time-frequency resource area on the PDSCH.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the processor is further configured to detect the scrambled indication information based on the CSI-RNTI of the target group in the second preset time-frequency resource area in a target time period, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the processor is further configured to: after detection succeeds, mark the CSI-RNTI of the target group by using an invalid mark, where the invalid mark is used to indicate that the CSI-RNTI of the target group is invalid.

According to a seventh aspect, a configuration information transmission system is provided, and the system includes a base station and target UE, where the base station is the base station according to the third aspect, and the target UE is the target UE according to the fourth aspect.

According to an eighth aspect, a configuration information transmission system is provided, and the system includes a base station and target UE, where the base station is the base station according to the fifth aspect, and the target UE is the target UE according to the sixth aspect.

The technical solutions provided in the embodiments of the present invention bring the following beneficial effects:

According to the configuration information transmission method, apparatus, and system provided in the embodiments of the present invention, the base station determines the configuration information corresponding to the target group, and sends, in the first preset time-frequency resource area, the configuration information to the UE in the target group. The base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

DESCRIPTION OF EMBODIMENTS

Figure 1:
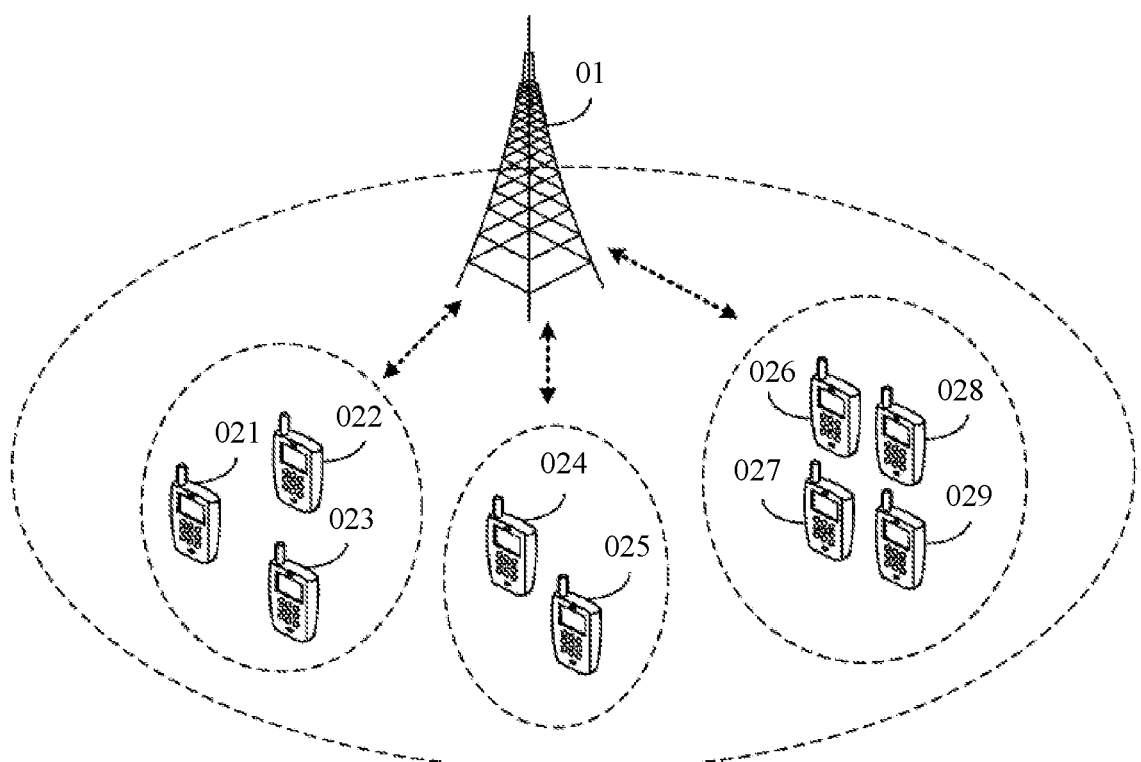
FIG. 1 is a schematic diagram of an implementation environment related to embodiments of this application.

Referring to FIG. 1, FIG. 1 shows a schematic diagram of an implementation environment related to embodiments of this application. Referring to FIG. 1, the implementation environment may include a base station 01 and a plurality of UEs.

The base station 01 may deliver configuration information to the plurality of UEs to perform resource configuration on the plurality of UEs. The configuration information may be used to indicate a channel state information-reference signal (Channel State Information-Reference Signal, CSI-RS) configuration of UE.

CSI-RS configurations of some UEs in the plurality of UEs are the same. The base station 01 may group the plurality of UEs based on the configuration information of the plurality of UEs, to obtain m groups. Each group includes at least two UEs, and CSI-RS configurations of all UEs in a same group are the same, where m is an integer greater than or equal to 1. For example, as shown in FIG. 1, the plurality of UEs include UE-021, UE-022, UE-023, UE-024, UE-025, UE-026, UE-027, UE-028, and UE-029. If CSI-RS configurations of the UE-021, the UE-022, and the UE-023 are the same, CSI-RS configurations of the UE-024 and the UE-025 are the same, and CSI-RS configurations of the UE-026, the UE-027, the UE-028, and the UE-029 are the same, the base station 01 may divide these UEs into three groups, and the three groups may be a group A, a group B, and a group C. The group A includes the UE-21, the UE-022, and the UE-023. The group B includes the UE-024 and the UE-025. The group C includes the UE-026, the UE-027, the UE-028, and the UE-029.

After obtaining the m groups, the base station 01 may allocate a group identifier to each group. The group identifier may be a channel state information-radio network temporary identifier (Channel State Information-Radio Network Temporary Identity, CSI-RNTI). For example, a CSI-RNTI of the group A may be an ID-A, a CSI-RNTI of the group B may be an ID-B, and a CSI-RNTI of the group C may be an ID-C. The base station 01 may deliver the ID-A to the UE-021, the UE-022 and the UE-023, deliver the ID-B to the UE-024 and the UE-025, and deliver the ID-C to the UE-026, the UE-027, the UE-028, and the UE-029. The ID-A, the ID-B, and the ID-C may be the same or may be different.

The base station 01 may determine configuration information corresponding to a target group (that is, configuration information of UE in the target group), and then send, in a first preset time-frequency resource area, the configuration information to the UE in the target group. Before the base station 01 sends the configuration information to the UE in the target group, the base station 01 may determine indication information, obtain a CSI-RNTI of the target group, scramble the indication information by using the CSI-RNTI of the target group, and send, in a second preset time-frequency resource area on a PDCCH, scrambled indication information to the UE in the target group. The indication information is used to indicate a location of the first preset time-frequency resource area on a PDSCH, a modulation and coding scheme of target UE, and the like. Each UE in the target group may detect, based on the group identifier of the target group in the second preset time-frequency resource area on the PDCCH, the scrambled indication information sent by the base station, descramble the scrambled indication information to obtain the indication information, and read, based on the indication information, the configuration information corresponding to the target group from the first preset time-frequency resource area on the PDSCH.

For example, if the target group is the group A, the base station 01 may determine configuration information and indication information that are corresponding to the group A, scramble the indication information by using the ID-A, and send, in the second preset time-frequency resource area on the PDCCH, scrambled indication information to the UE-021, the UE-022, and the UE-023 in the group A. The UE-021 may detect, based on the ID-A in the second preset time-frequency resource area on the PDCCH, the scrambled indication information sent by the base station, descramble the scrambled indication information to obtain the indication information, and read, based on the indication information, the configuration information corresponding to the target group from the first preset time-frequency resource area on the PDSCH. Likewise, the UE-022 and the UE-023 may also obtain the corresponding configuration information.

Similarly, the UE-024 and the UE-025 may obtain corresponding configuration information, and the UE-026, the UE-027, the UE-028, and the UE-029 may obtain corresponding configuration information.

It should be noted that, in a related technology, for the UE-021, the UE-022, and the UE-023, the base station 01 separately sends, to the UE-021, the UE-022, and the UE-023, configuration information and indication information that is scrambled by using a corresponding radio network temporary identifier (Radio Network Temporary Identity, RNTI) of UE. It is assumed that an RNTI of the UE-021 is an ID-A1, an RNTI of the UE-022 is an ID-A2, and an RNTI of the UE-023 is an ID-A3. That is, the base station 01 sends, to the UE-021, configuration information and indication information that is scrambled by using the ID-A1; sends, to the UE-022, configuration information and indication information that is scrambled by using the ID-A2; and sends, to the UE-023, configuration information and indication information that is scrambled by using the ID-A3. The UE-021, the UE-022, and the UE-023 perform detection based on their respective RNTIs to obtain corresponding indication information, and read their respective configuration information based on the corresponding indication information. In this way, signaling overheads are relatively high, because the configuration information of the UE-021, the UE-022, and the UE-023 is the same, but the base station 01 needs to send three pieces of indication information and three pieces of same configuration information.

Figure 2:
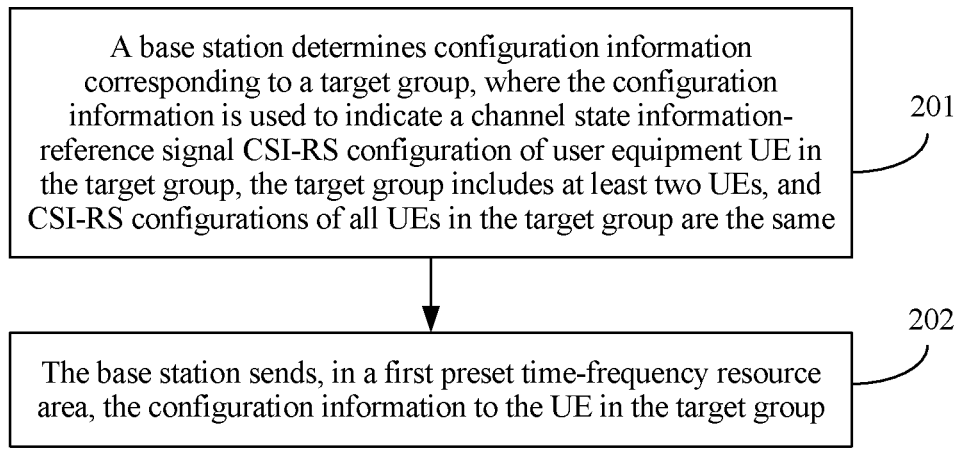
FIG. 2 is a flowchart of a configuration information transmission method according to an embodiment of the present invention.

Referring to FIG. 2, FIG. 2 shows a flowchart of a configuration information transmission method according to an embodiment of the present invention. The configuration information transmission method may be performed by the base station 01 in the implementation environment shown in FIG. 1. Referring to FIG. 2, the configuration information transmission method may include the following steps.

Step 201: A base station determines configuration information corresponding to a target group, where the configuration information is used to indicate a channel state information-reference signal CSI-RS configuration of user equipment UE in the target group, the target group includes at least two UEs, and CSI-RS configurations of all UEs in the target group are the same.

Step 202: The base station sends, in a first preset time-frequency resource area, the configuration information to the UE in the target group.

In conclusion, according to the configuration information transmission method provided in this embodiment of the present invention, the base station determines the configuration information corresponding to the target group, and sends, in the first preset time-frequency resource area, the configuration information to the UE in the target group. The base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

Optionally, the first preset time-frequency resource area is on a physical downlink shared channel PDSCH.

Before step 202, the method further includes:

determining, by the base station, indication information, where the indication information is used to indicate a location of the first preset time-frequency resource area on the PDSCH;

determining, by the base station, a channel state information CSI radio network temporary identifier RNTI of the target group;

scrambling, by the base station, the indication information by using the CSI-RNTI of the target group; and sending, by the base station in a second preset time-frequency resource area on a physical downlink control channel PDCCH, scrambled indication information to the UE in the target group.

Optionally, before the sending, by the base station in a second preset time-frequency resource area on a physical downlink control channel PDCCH, scrambled indication information to the UE in the target group, the method further includes:

adding, by the base station, the CSI-RNTI of the target group to radio resource control RRC signaling, and sending the radio resource control RRC signaling to the UE in the target group.

Optionally, a group served by the base station includes m groups, where m is an integer greater than or equal to 1, and the target group is any one of the m groups;

CSI-RNTIs of any two groups in the m groups are different; or

CSI-RNTIs of all groups in the m groups are the same; and when the CSI-RNTIs of all the groups in the m groups are the same, scrambled indication information corresponding to all the groups in the m groups is sent at different time, and the sending, by the base station in a second preset time-frequency resource area on a physical downlink control channel PDCCH, scrambled indication information to the UE in the target group includes:

sending, by the base station in the second preset time-frequency resource area in a target time period, the scrambled indication information to the UE in the target group, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, before the sending, by the base station in a second preset time-frequency resource area on a physical downlink control channel PDCCH, scrambled indication information to the UE in the target group, the method further includes:

determining, by the base station, search space that includes a plurality of preset control channel elements CCEs on the PDCCH as the group search space.

In conclusion, according to the configuration information transmission method provided in this embodiment of the present invention, the base station determines the configuration information corresponding to the target group, and sends, in the first preset time-frequency resource area, the configuration information to the UE in the target group. The base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

Figure 3:
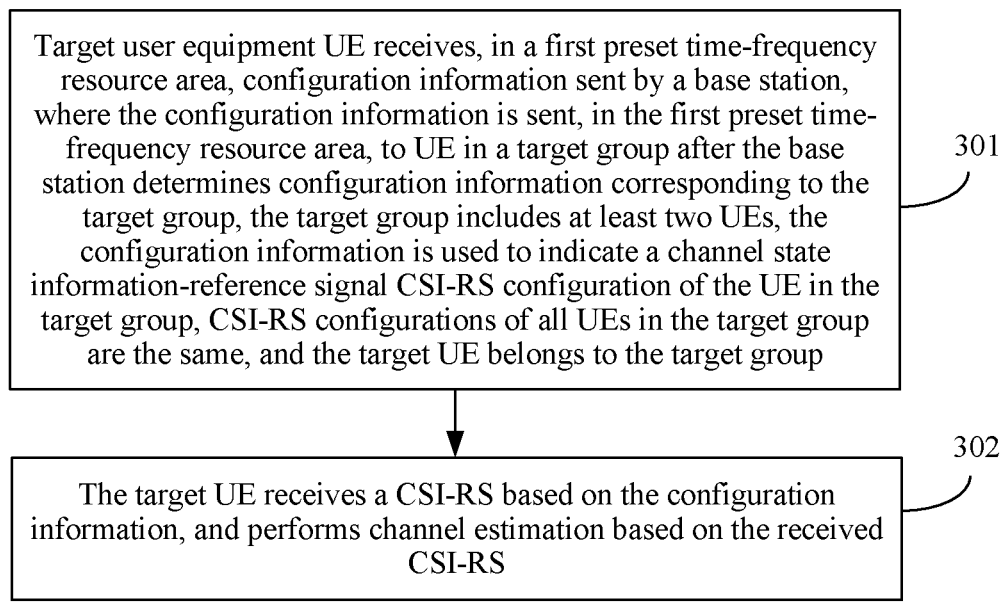
FIG. 3 is a flowchart of another configuration information transmission method according to an embodiment of the present invention.

Referring to FIG. 3, FIG. 3 shows a flowchart of another configuration information transmission method according to an embodiment of the present invention. The configuration information transmission method may be performed by the target UE in the target group in the implementation environment shown in FIG. 1. Referring to FIG. 3, the configuration information transmission method may include the following steps.

Step 301: Target user equipment UE receives, in a first preset time-frequency resource area, configuration information sent by a base station, where the configuration information is sent, in the first preset time-frequency resource area, to UE in a target group after the base station determines configuration information corresponding to the target group, the target group includes at least two UEs, the configuration information is used to indicate a channel state information-reference signal CSI-RS configuration of the UE in the target group, CSI-RS configurations of all UEs in the target group are the same, and the target UE belongs to the target group.

Step 302: The target UE receives a CSI-RS based on the configuration information, and performs channel estimation based on the received CSI-RS.

In conclusion, according to the configuration information transmission method provided in this embodiment of the present invention, the target UE receives, in the first preset time-frequency resource area, the configuration information sent by the base station, receives the CSI-RS based on the configuration information, and performs the channel estimation based on the received CSI-RS. The configuration information is sent, in the first preset time-frequency resource area, to the UE in the target group after the base station determines the configuration information corresponding to the target group, and the target UE belongs to the target group. The configuration information is sent, in the first preset time-frequency resource area, to the UE in the target group by the base station. Therefore, signaling overheads of configuration information transmission are relatively low, so that a problem of relatively high signaling overheads in a related technology is resolved, thereby achieving an effect of reducing signaling overheads.

Optionally, the first preset time-frequency resource area is on a physical downlink shared channel PDSCH.

Before step 301, the method further includes:

receiving, by the target UE, radio resource control RRC signaling sent by the base station, where the RRC signaling carries a channel state information CSI radio network temporary identifier RNTI of the target group; and detecting, by the target UE based on the CSI-RNTI of the target group in a second preset time-frequency resource area on a physical downlink control channel PDCCH, scrambled indication information sent by the base station, where the scrambled indication information is obtained by using the CSI-RNTI of the target group to scramble indication information after the base station determines the indication information, and the indication information is used to indicate a location of the first preset time-frequency resource area on the PDSCH.

Optionally, a group served by the base station includes m groups, where m is an integer greater than or equal to 1, and the target group is any one of the m groups;

CSI-RNTIs of any two groups in the m groups are different; or

CSI-RNTIs of all groups in the m groups are the same; and when the CSI-RNTIs of all the groups in the m groups are the same, scrambled indication information corresponding to all the groups in the m groups is sent at different time, and the detecting, by the target UE based on the CSI-RNTI of the target group in a second preset time-frequency resource area on a physical downlink control channel PDCCH, scrambled indication information sent by the base station includes:

detecting, by the target UE, the scrambled indication information based on the CSI-RNTI of the target group in the second preset time-frequency resource area in a target time period, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, after the detecting, by the target UE, the scrambled indication information based on the CSI-RNTI of the target group in the second preset time-frequency resource area in a target time period, the method further includes:

marking, by the target UE after detection succeeds, the CSI-RNTI of the target group by using an invalid mark, where the invalid mark is used to indicate that the CSI-RNTI of the target group is invalid.

In conclusion, according to the configuration information transmission method provided in this embodiment of the present invention, the target UE receives, in the first preset time-frequency resource area, the configuration information sent by the base station, receives the CSI-RS based on the configuration information, and performs the channel estimation based on the received CSI-RS. The configuration information is sent, in the first preset time-frequency resource area, to the UE in the target group after the base station determines the configuration information corresponding to the target group, and the target UE belongs to the target group. The configuration information is sent, in the first preset time-frequency resource area, to the UE in the target group by the base station. Therefore, signaling overheads of configuration information transmission are relatively low, so that a problem of relatively high signaling overheads in a related technology is resolved, thereby achieving an effect of reducing signaling overheads.

Figure 4A:
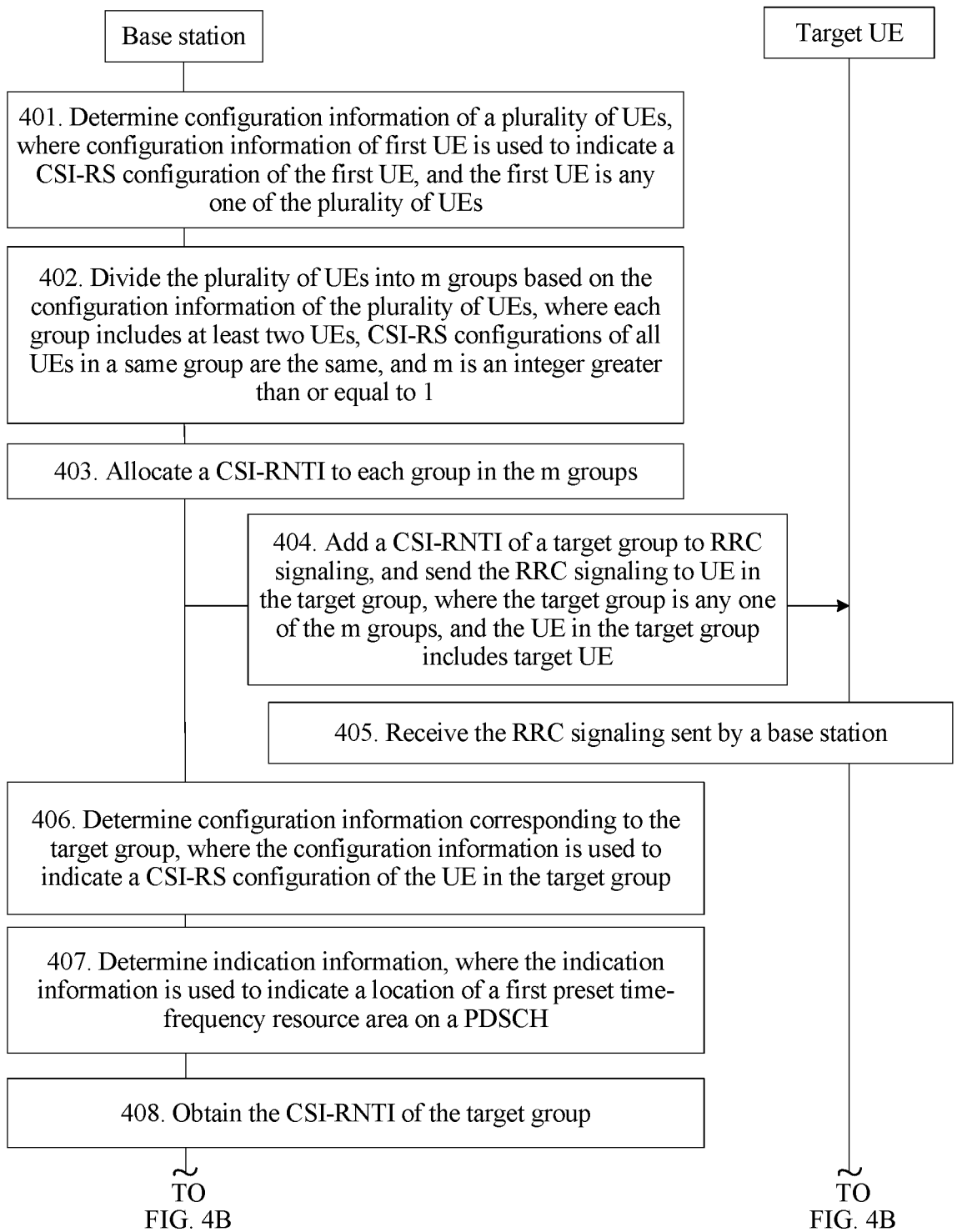
FIG. 4A and FIG. 4B are a flowchart of still another configuration information transmission method according to an embodiment of the present invention.
Figure 4B:
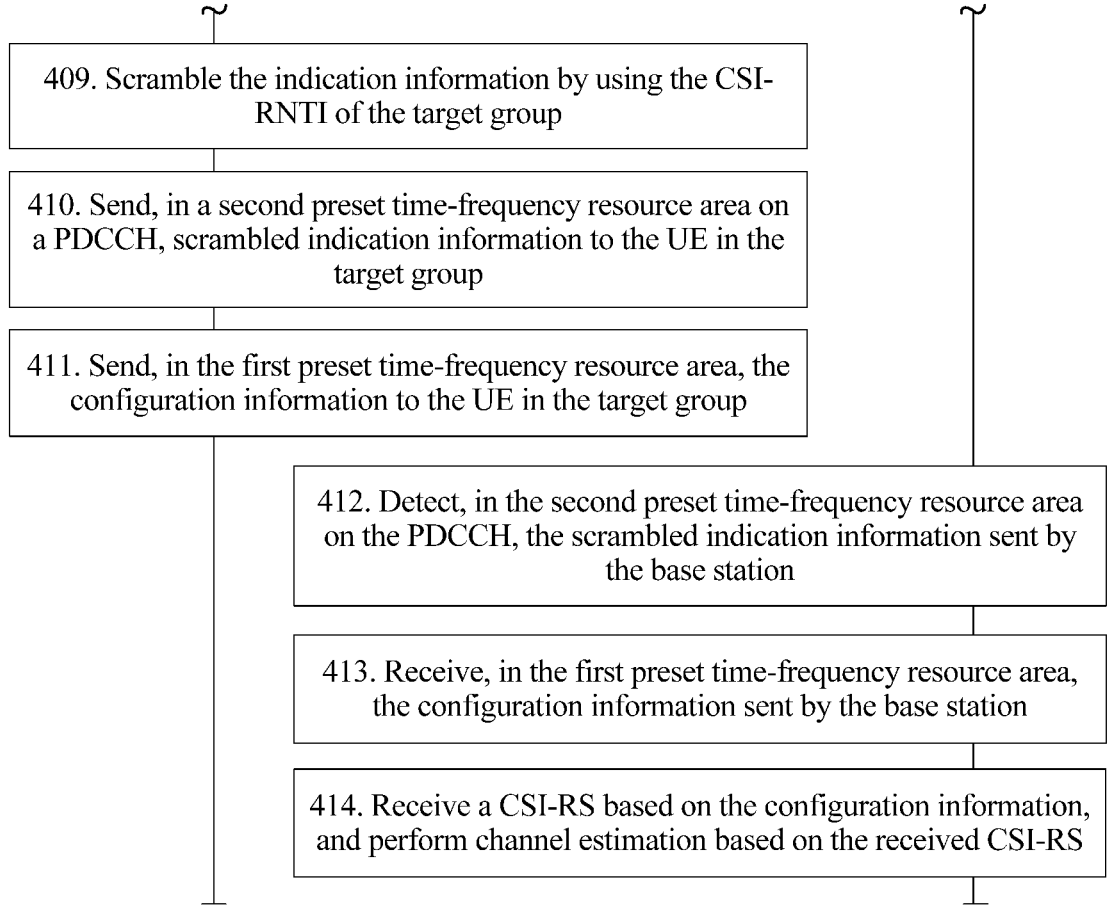

Referring to FIG. 4A and FIG. 4B, FIG. 4A and FIG. 4B show a flowchart of still another configuration information transmission method according to an embodiment of the present invention. In this embodiment, an example in which the configuration information transmission method is applied to the implementation environment shown in FIG. 1 is used for description. Referring to FIG. 4A and FIG. 4B, the configuration information transmission method may include the following steps.

Step 401: A base station determines configuration information of a plurality of UEs, where configuration information of first UE is used to indicate a CSI-RS configuration of the first UE, and the first UE is any one of the plurality of UEs.

The configuration information may be semi-static configuration information.

For example, the base station may be the base station 01 in the implementation environment shown in FIG. 1, and the plurality of UEs may include the UE-021, the UE-022, the UE-023, the UE-024, the UE-025, the UE-026, the UE-027, the UE-028, and the UE-029 in the implementation environment shown in FIG. 1. Therefore, that the base station determines the configuration information of the plurality of UEs is as follows: The base station 01 determines configuration information of the UE-021, configuration information of the UE-022, configuration information of the UE-023, configuration information of the UE-024, configuration information of the UE-025, configuration information of the UE-026, configuration information of the UE-027, configuration information of the UE-028, and configuration information of the UE-029.

The configuration information of the first UE is used to indicate the CSI-RS configuration of the first UE, and the first UE is any one of the plurality of UEs. For example, the first UE may be the UE-021, and the configuration information of the UE-021 is used to indicate a CSI-RS configuration of the UE-021.

For a specific implementation process in which the base station determines the configuration information of the plurality of UEs, refer to a related technology. Details are not described in this embodiment of the present invention.

Step 402: The base station divides the plurality of UEs into m groups based on the configuration information of the plurality of UEs, where each group includes at least two UEs, CSI-RS configurations of all UEs in a same group are the same, and m is an integer greater than or equal to 1.

In this embodiment of the present invention, configuration information of some UEs in the plurality of UEs may be the same. For example, some UEs in the plurality of UEs measure a same port (port), or weights (weight) of beamformed (beamforming) CSI-RSs of some UEs in the plurality of UEs are the same. Therefore, the base station may divide the plurality of UEs into the m groups based on the configuration information of the plurality of UEs, where CSI-RS configurations of all UEs in a same group are the same (that is, configuration information of all UEs in a same group is the same), and m is an integer greater than or equal to 1. After the base station divides the plurality of UEs into the m groups, each group may be corresponding to one piece of configuration information. Configuration information corresponding to a first group is used to indicate a CSI-RS configuration of UE in the first group, and the first group is any one of the m groups. This is not limited in this embodiment of the present invention.

For example, if CSI-RS configurations of the UE-021, the UE-022, and the UE-023 are the same, CSI-RS configurations of the UE-024 and the UE-025 are the same, and CSI-RS configurations of the UE-026, the UE-027, the UE-028, and the UE-029 are the same, the base station 01 may divide the nine UEs into three groups based on the configuration information of the nine UEs. The three groups may be a group A, a group B, and a group C. Each group may be corresponding to one piece of configuration information. For example, configuration information corresponding to the group A may be configuration information a, configuration information corresponding to the group B may be configuration information b, and configuration information corresponding to the group C may be configuration information c. The group A includes the UE-021, the UE-022, and the UE-023, the group B includes the UE-024 and the UE-025, and the group C includes the UE-026, the UE-027, the UE-028, and the UE-029. The configuration information a corresponding to the group A is used to indicate the CSI-RS configurations of the UE-021, the UE-022, and the UE-023, the configuration information b corresponding to the group B is used to indicate the CSI-RS configurations of the UE-024 and the UE-025, and the configuration information c corresponding to the group C is used to indicate the CSI-RS configurations of the UE-026, the UE-027, the UE-028, and the UE-029.

Step 403: The base station allocates a CSI-RNTI to each group in the m groups.

After dividing the plurality of UEs into the m groups, the base station may allocate the CSI-RNTI to each group in the m groups. For example, the base station 01 allocates a CSI-RNTI to the group A, allocates a CSI-RNTI to the group B, and allocates a CSI-RNTI to the group C. The CSI-RNTI of the group A may be an ID-A, the CSI-RNTI of the group B may be an ID-B, and the CSI-RNTI of the group C may be an ID-C. This is not limited in this embodiment of the present invention.

For a process in which the base station allocates the CSI-RNTIs to the m groups, refer to a process in which a base station allocates an RNTI to UE in the related technology, and details are not described in this embodiment of the present invention.

It should be noted that, in this embodiment of the present invention, CSI-RNTIs of all groups in the m groups may be the same, or CSI-RNTIs of any two groups in the m groups are different. This is not limited in this embodiment of the present invention. A reserved value of an RNTI in a protocol of the related technology is limited. Therefore, in this embodiment of the present invention, a same CSI-RNTI is allocated to all the groups, so that CSI-RNTI values may be reduced.

Step 404: The base station adds a CSI-RNTI of a target group to RRC signaling, and sends the RRC signaling to UE in the target group, where the target group is any one of the m groups, and the UE in the target group includes target UE.

The base station may encapsulate the CSI-RNTI of the target group into the RRC signaling, and then send the RRC signaling to the UE in the target group by using a PDSCH. The target group is any one of the m groups, and the UE in the target group includes the target UE.

In this embodiment of the present invention, the base station may send corresponding RRC signaling to UE in each group in the m groups, and the m groups include the target group; or the base station may send RRC signaling only to the UE in the target group. This is not limited in this embodiment of the present invention.

For example, if the target group is the group A, the base station 01 encapsulates the ID-A into RRC signaling, and then sends the RRC signaling to the UE-021, the UE-022, and the UE-023 in the target group A by using the PDSCH.

Step 405: The target UE receives the RRC signaling sent by the base station.

The RRC signaling carries the CSI-RNTI of the target group.

When the base station sends the RRC signaling to the UE in the target group, the target UE may receive the RRC signaling sent by the base station, and process the RRC signaling to obtain the CSI-RNTI of the target group, where the target UE belongs to the target group.

For example, the target group may be the group A, and the target UE may be the UE-021 in the group A. Therefore, the UE-021 receives RRC signaling sent by the base station 01, and processes the RRC signaling to obtain the CSI-RNTI of the target group, where the CSI-RNTI of the target group is the ID-A.

It should be noted that after the target UE obtains the CSI-RNTI of the target group, if the target UE stores a CSI-RNTI, the target UE may update, based on the CSI-RNTI of the target group, the CSI-RNTI stored in the target UE. For example, if the UE-021 belongs to the group B before, and a stored CSI-RNTI is the ID-B, after the UE-021 obtains the ID-A, the target UE may update the previously stored ID-B based on the ID-A. In this case, the UE-021 belongs to the group A.

Step 406: The base station determines configuration information corresponding to the target group, where the configuration information is used to indicate a CSI-RS configuration of the UE in the target group.

It may be learned from step 402 that each group in the m groups is corresponding to one piece of configuration information. Therefore, the base station may determine the configuration information corresponding to the target group, where the configuration information corresponding to the target group is used to indicate the CSI-RS configuration of the UE in the target group. The target group includes at least two UEs, and CSI-RS configurations of all UEs in the target group are the same.

For example, the target group is the group A, and configuration information corresponding to the group A is configuration information a. Therefore, the base station 01 may determine the configuration information a, and the configuration information a is used to indicate CSI-RS configurations of the UE-021, the UE-022, and the UE-023.

It should be noted that in this embodiment of the present invention, after determining the configuration information corresponding to the target group, the base station may encapsulate the configuration information corresponding to the target group into RRC signaling, and send, in a first preset time-frequency resource area on the PDSCH, the RRC signaling to the UE in the target group, or add the configuration information corresponding to the target group to DCI, and send, in a second preset time-frequency resource area on a PDCCH, the DCI to the UE in the target group. When the base station sends, in the first preset time-frequency resource area on the PDSCH, the configuration information to the UE in the target group, the base station needs to send, in the second preset time-frequency resource area on the PDCCH, indication information to the UE in the target group. The indication information is used to indicate a location of the first preset time-frequency resource area on the PDSCH, so that the UE in the target group can read the configuration information from the RRC signaling in the first preset time-frequency resource area based on the indication information. In this embodiment of the present invention, an example in which the base station encapsulates the configuration information corresponding to the target group into the RRC signaling is used for description.

Step 407: The base station determines indication information, where the indication information is used to indicate a location of a first preset time-frequency resource area on a PDSCH.

The base station may determine the indication information, where the indication information is used to indicate the location of the first preset time-frequency resource area on the PDSCH. For example, the indication information may be indication information Z.

Optionally, after determining the first preset time-frequency resource area, the base station may generate the indication information. For a specific implementation process in which the base station generates the indication information, refer to the related technology. Details are not described in this embodiment of the present invention.

Step 408: The base station obtains the CSI-RNTI of the target group.

The base station may obtain the CSI-RNTI of the target group. For example, the base station obtains a CSI-RNTI of the target group A, and the CSI-RNTI of the target group A may be the ID-A.

Step 409: The base station scrambles the indication information by using the CSI-RNTI of the target group.

After determining the indication information and obtaining the CSI-RNTI of the target group, the base station may scramble the indication information by using the CSI-RNTI of the target group, to obtain scrambled indication information. For example, the base station 01 scrambles indication information Z by using the ID-A, to obtain scrambled indication information Z1. For a specific implementation process in which the base station scrambles the indication information by using the CSI-RNTI of the target group, refer to the related technology. Details are not described in this embodiment of the present invention.

Step 410: The base station sends, in a second preset time-frequency resource area on a PDCCH, scrambled indication information to the UE in the target group.

Optionally, the base station may encapsulate the scrambled indication information into DCI, and send the scrambled indication information to the UE in the target group by using the second preset time-frequency resource area on the PDCCH. The scrambled indication information is scrambled by using the CSI-RNTI of the target group, and in this embodiment of the present invention, CSI-RNTIs of the m groups may be the same, or may be different. Therefore, when the CSI-RNTIs of the m groups are different, the base station may send indication information scrambled by using a corresponding CSI-RNTI to UE in different groups in a same time period, or may send indication information scrambled by using a corresponding CSI-RNTI to UE in different groups in different time periods. When the CSI-RNTIs of the m groups are the same, if the base station sends indication information scrambled by using a same CSI-RNTI to UE in different groups in a same time period, UE in another group in the m groups except the target group can also detect the indication information. This results in a configuration information receiving error. Therefore, when the CSI-RNTIs of the m groups are the same, each group may be corresponding to a time period, and the CSI-RNTI is valid only for UE in a corresponding group in a corresponding time period. This can avoid a case of a configuration information receiving error. When sending configuration information to UE in the groups, the base station may send configuration information to UE in a corresponding group based on an emergency degree of the configuration information. A sequence of sending the configuration information may be in positive correlation with the emergency degree.

In this embodiment of the present invention, when the CSI-RNTIs of the m groups are the same, step 410 may alternatively be: The base station sends, in a second preset time-frequency resource area in a target time period, scrambled indication information to the UE in the target group, where the target time period is corresponding to the target group. For example, the base station sends, in the second preset time-frequency resource area in the target time period, scrambled indication information to the UE-021, the UE-022, and the UE-023 in the group A. For example, a time period corresponding to each group may be a TTI, and the base station may send, in the second preset time-frequency resource area in a TTI corresponding to the target group, scrambled indication information to the UE in the target group.

It should be noted that search space on the PDCCH may include UE search space, common search space, and group search space, where the UE search space and the common search space are search space in the related technology, and the group search space is newly added search space in this application. The UE search space is used to carry DCI sent by the base station to UE. The DCI in the UE search space may be scrambled by using an RNTI of the UE. Therefore, the UE can detect corresponding DCI in the UE search space based on the RNTI of the UE. The common search space is used to carry common DCI sent by the base station, and the DCI in the common search space may be scrambled by using a common identifier of all UEs. Therefore, the UE can detect corresponding DCI in the common search space based on the common identifier of all UEs. The common identifier of all UEs may include but is not limited to a paging identifier, a transport format identifier, an uplink power control identifier, and the like. The group search space is the newly added search space in this application. The group search space is fixedly located on some CCEs of the PDCCH, and is used to carry DCI sent by the base station to a group. The DCI in the group search space may be scrambled by using a CSI-RNTI of the group. Therefore, the UE can detect corresponding DCI in the group search space based on the CSI-RNTI of the group. In this embodiment of the present invention, the second preset time-frequency resource area may be a time-frequency resource area in the common search space, or may be a time-frequency resource area in the group search space. When the second preset time-frequency resource area is the time-frequency resource area in the group search space, before sending, in the second preset time-frequency resource area on the PDCCH, the scrambled indication information to the UE in the target group, the base station may determine search space that includes a plurality of preset CCEs on the PDCCH as the group search space, and then send, in the second preset time-frequency resource area on the PDCCH, the scrambled indication information to the UE in the target group. For a process in which the base station determines the search space that includes a plurality of preset CCEs on the PDCCH as the group search space, refer to the related technology. This is not limited in this embodiment of the present invention. Based on the reserved value of the RNTI in the protocol of the related technology, when the second preset time-frequency resource area is the time-frequency resource area in the common search space, a value of a CSI-RNTI may be FFF4-FFFC (hexadecimal digits), or when the second preset time-frequency resource area is the time-frequency resource area in the group search space, a value of a CSI-RNTI may be 0000-FFFF (hexadecimal digits). In this embodiment of the present invention, the group search space is set to improve compatibility well.

Step 411: The base station sends, in the first preset time-frequency resource area, the configuration information to the UE in the target group.

When the first preset time-frequency resource area is on the PDSCH, the step is: The base station sends, in the first preset time-frequency resource area on the PDSCH, the configuration information to the UE in the target group. When the first preset time-frequency resource area is on the PDCCH, the step is: The base station sends, in the first preset time-frequency resource area on the PDCCH, the configuration information to the UE in the target group. In this embodiment of the present invention, an example in which the first preset time-frequency resource area is on the PDSCH is used for description.

For example, the base station 01 sends, in the first preset time-frequency resource area, the configuration information a to the UE-021, the UE-022, and the UE-023 in the target group A.

Step 412: The target UE detects, in the second preset time-frequency resource area on the PDCCH, the scrambled indication information sent by the base station.

The scrambled indication information is obtained by using the CSI-RNTI of the target group to scramble the indication information after the base station determines the indication information. The indication information may be used to indicate the location of the first preset time-frequency resource area on the PDSCH, a modulation and coding scheme of the target UE, and the like.

The target UE may detect the scrambled indication information based on the CSI-RNTI of the target group in the second preset time-frequency resource area on the PDCCH. When the CSI-RNTIs of the m groups are the same, the target UE may detect the scrambled indication information based on the CSI-RNTI of the target group in the second preset time-frequency resource area in the target time period corresponding to the target group. This is not limited in this embodiment of the present invention.

For example, the target UE may be the UE-021, and the UE-021 may detect scrambled indication information Z1 based on the CSI-RNTI of the target group in the second preset time-frequency resource area in a target time period corresponding to the target group A.

Step 413: The target UE receives, in the first preset time-frequency resource area, the configuration information sent by the base station.

The configuration information is sent, in the first preset time-frequency resource area, to the UE in the target group after the base station determines the configuration information corresponding to the target group, the target group includes at least two UEs, the configuration information is used to indicate the CSI-RS configuration of the UE in the target group, the CSI-RS configurations of all the UEs in the target group are the same, and the target UE belongs to the target group.

After detecting the scrambled indication information, the target UE may descramble the scrambled indication information to obtain the indication information, and receive, in the first preset time-frequency resource area based on the indication information, the configuration information sent by the base station. For example, the UE-021 receives, in the first preset time-frequency resource area, the configuration information a sent by the base station 01.

It should be noted that when the CSI-RNTIs of the m groups are the same, after successfully detecting the indication information, the target UE may mark the CSI-RNTI of the target group by using an invalid mark, where the invalid mark is used to indicate that the CSI-RNTI of the target group is invalid, so that another group can use the CSI-RNTI. Optionally, the target UE may delete or discard the CSI-RNTI of the target group, so that the CSI-RNTI of the target group is invalid for the target UE.

Step 414: The target UE receives a CSI-RS based on the configuration information, and performs channel estimation based on the received CSI-RS.

After receiving the configuration information, the target UE may receive the CSI-RS based on the configuration information, and perform the channel estimation based on the received CSI-RS. For a process in which the target UE performs the channel estimation based on the received CSI-RS, refer to the related technology, and details are not described herein in this embodiment of the present invention.

It should be noted that the first preset time-frequency resource area may be a time-frequency resource area on the PDSCH, or may be a time-frequency resource area on the PDCCH. When the first preset time-frequency resource area is the time-frequency resource area on the PDSCH, configuration information transmission between the base station and the UE may be implemented according to the foregoing step 401 to step 414. When the first preset time-frequency resource area is the time-frequency resource area on the PDCCH, configuration information transmission between the base station and the UE may be implemented according to the foregoing step 401 to step 406, step 413, and step 414. In this process, the base station needs to encapsulate the configuration information corresponding to the target group into DCI, and performs scrambling by using the CSI-RNTI of the target group. The target UE may perform blind detection on the PDCCH based on the CSI-RNTI of the target group, to obtain the configuration information corresponding to the target group. Details are not described herein in this embodiment of the present invention. It should be further noted that an example in which the indication information is transmitted on the PDCCH is used for description in this embodiment of the present invention. In actual application, the indication information may be transmitted on an enhanced physical downlink control channel (Enhanced physical downlink control channel, EPDCCH). This is not limited in this embodiment of the present invention.

It should be additionally noted that a sequence of the steps of the configuration information transmission method provided in this embodiment of the present invention may be properly adjusted, and a step may be correspondingly added or removed according to a situation. Any variation readily figured out by a person skilled in the art within the technical scope disclosed in this application shall fall within the protection scope of this application, and details are not described herein.

In conclusion, according to the configuration information transmission method provided in this embodiment of the present invention, the base station determines the configuration information corresponding to the target group, and sends, in the first preset time-frequency resource area, the configuration information to the UE in the target group. The base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

With the use of a massive (Massive) multiple-input multiple-output (Multiple-Input Multiple-Out-put, MIMO) system, a quantity of UEs served by a base station increases. The base station needs to send, to each UE, RRC signaling that carries corresponding configuration information. In this way, when configuration information of a group of UEs is the same, RRC signaling overheads are relatively high because the base station needs to send RRC signaling to each UE. According to the configuration information transmission method provided in this embodiment of the present invention, RRC signaling overheads may be significantly reduced in a network in which UEs are dense.

With the development of communications systems, in a future 5th Generation (Fifth Generation, 5G) communications system, each network can accommodate more users. With a massive increase in a quantity of users, various configuration information provided for UE by a base station also increases greatly. This causes extremely high signaling overheads. In a cell, a configuration of UE changes with changes in various factors (for example, a change in a channel environment). In a scenario in which UEs are dense, a group of UEs may need same semi-static configuration information. When the semi-static configuration information needs to be updated, a base station in the related technology needs to deliver, to each UE, one piece of RRC signaling carrying semi-static configuration information. This causes relatively high signaling overheads. In this embodiment of the present invention, semi-static configuration information is sent, in the first preset time-frequency resource area, to all UEs in a group, so that signaling overheads are reduced.

The following briefly describes an effect of this embodiment of the present invention by using a simple example.

If an optional item in RRC signaling is not considered, RRC signaling that carries configuration information and that is sent by a base station to UE includes a CSI process and a CSI-RS resource configuration. The CSI process is used to indicate the CSI-RS resource configuration. The CSI-RS resource configuration includes a quantity of ports of a CSI-RS, an update period of the CSI-RS, a sending moment of the CSI-RS, and a physical resource block occupied by the CSI-RS. It is assumed that the CSI process needs 16 bits (bit), the CSI-RS resource configuration needs 26 bits, and the base station serves 30 UEs.

In the related technology, the base station needs to send, to each UE, one piece of RRC signaling carrying configuration information. Therefore, signaling overheads in the related technology are 30*(16+26)=1260 bits.

In this embodiment of the present invention, the base station may divide the 30 UEs into five groups. Each group includes six UEs. The base station needs three bits to send, to UE, RRC signaling carrying a CSI-RNTI of a group. One piece of RRC signaling carrying configuration information is sent to each group. Therefore, signaling overheads in this embodiment of the present invention are 30*3+(16+26) *5=300 bits.

Therefore, in this case, in this embodiment of the present invention, (1260−300) bits of signaling may be saved, and signaling may be reduced by (1260−300)/1260=76%.

Figure 5:
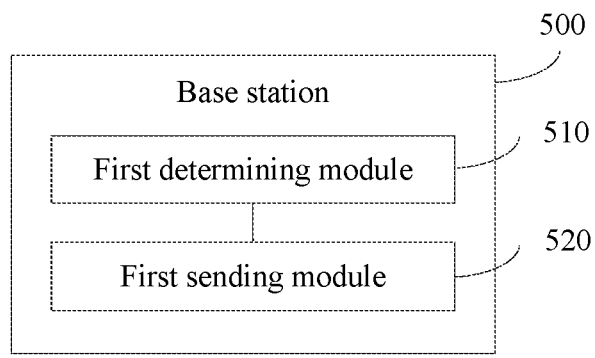
FIG. 5 is a block diagram of a base station according to an embodiment of the present invention.

Referring to FIG. 5, FIG. 5 shows a block diagram of a base station 500 according to an embodiment of the present invention. The base station 500 may be the base station 01 in the implementation environment shown in FIG. 1, and is configured to perform some method steps provided in the embodiment shown in FIG. 4A and FIG. 4B and all method steps provided in the embodiment shown in FIG. 2. Referring to FIG. 5, the base station 500 may include:

a first determining module 510, configured to determine configuration information corresponding to a target group, where the configuration information is used to indicate a channel state information-reference signal CSI-RS configuration of user equipment UE in the target group, the target group includes at least two UEs, and CSI-RS configurations of all UEs in the target group are the same; and a first sending module 520, configured to send, in a first preset time-frequency resource area, the configuration information to the UE in the target group.

In conclusion, according to the base station provided in this embodiment of the present invention, the base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

Figure 6:
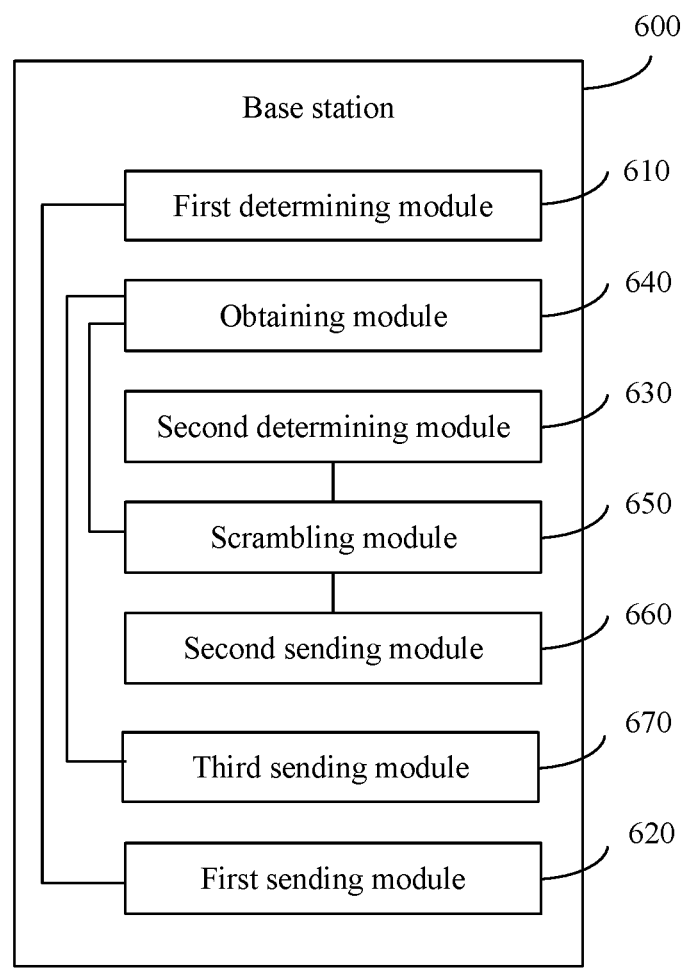
FIG. 6 is a block diagram of another base station according to an embodiment of the present invention.

Referring to FIG. 6, FIG. 6 shows a block diagram of another base station 600 according to an embodiment of the present invention. The base station 600 may be the base station 01 in the implementation environment shown in FIG. 1, and is configured to perform some method steps provided in the embodiment shown in FIG. 4A and FIG. 4B and all method steps provided in the embodiment shown in FIG. 2. Referring to FIG. 6, the base station 600 may include:

a first determining module 610, configured to determine configuration information corresponding to a target group, where the configuration information is used to indicate a channel state information-reference signal CSI-RS configuration of user equipment UE in the target group, the target group includes at least two UEs, and CSI-RS configurations of all UEs in the target group are the same; and a first sending module 620, configured to send, in a first preset time-frequency resource area, the configuration information to the UE in the target group.

Optionally, the first preset time-frequency resource area is on a physical downlink shared channel PDSCH, and the base station 600 further includes:

a second determining module 630, configured to determine indication information, where the indication information is used to indicate a location of the first preset time-frequency resource area on the PDSCH;

an obtaining module 640, configured to obtain a channel state information CSI radio network temporary identifier RNTI of the target group;

a scrambling module 650, configured to scramble the indication information by using the CSI-RNTI of the target group; and a second sending module 660, configured to send, in a second preset time-frequency resource area on a physical downlink control channel PDCCH, scrambled indication information to the UE in the target group.

Optionally, the base station 600 further includes: a third sending module 670, configured to add the CSI-RNTI of the target group to radio resource control RRC signaling, and send the radio resource control RRC signaling to the UE in the target group.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the second sending module 660 is configured to send, in the second preset time-frequency resource area in a target time period, the scrambled indication information to the UE in the target group, where the target time period is corresponding to the target group.

Optionally, the second preset time-frequency resource area is a time-frequency resource area in common search space, and the common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the base station may further include: a third determining module (not shown in FIG. 6), configured to determine search space that includes a plurality of preset control channel elements CCEs on the PDCCH as the group search space.

In conclusion, according to the base station provided in this embodiment of the present invention, the base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

Figure 7:
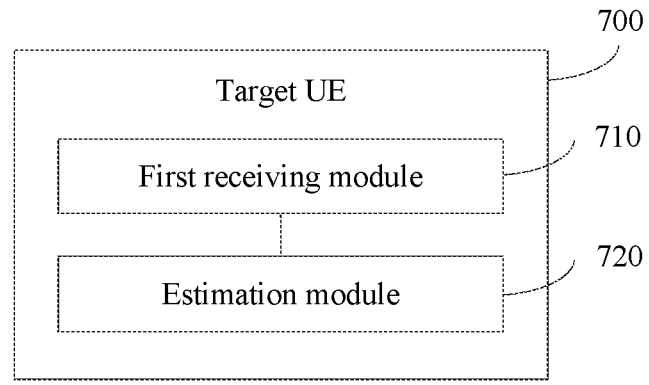
FIG. 7 is a block diagram of target UE according to an embodiment of the present invention.

Referring to FIG. 7, FIG. 7 shows a block diagram of target UE-700 according to an embodiment of the present invention. The target UE-700 may be the UE in the target group in the implementation environment shown in FIG. 1, and is configured to perform some method steps provided in the embodiment shown in FIG. 4A and FIG. 4B and all method steps provided in the embodiment shown in FIG. 3. Referring to FIG. 7, the target UE-700 may include:

a first receiving module 710, configured to receive, in a first preset time-frequency resource area, configuration information sent by a base station, where the configuration information is sent, in the first preset time-frequency resource area, to UE in a target group after the base station determines configuration information corresponding to the target group, the target group includes at least two UEs, the configuration information is used to indicate a channel state information-reference signal CSI-RS configuration of the UE in the target group, CSI-RS configurations of all UEs in the target group are the same, and the target UE belongs to the target group; and an estimation module 720, configured to: receive a CSI-RS based on the configuration information, and perform channel estimation based on the received CSI-RS.

In conclusion, according to the target UE provided in this embodiment of the present invention, the target UE receives, in the first preset time-frequency resource area, the configuration information sent by the base station, receives the CSI-RS based on the configuration information, and performs the channel estimation based on the received CSI-RS. The configuration information is sent, in the first preset time-frequency resource area, to the UE in the target group after the base station determines the configuration information corresponding to the target group, and the target UE belongs to the target group. The configuration information is sent, in the first preset time-frequency resource area, to the UE in the target group by the base station. Therefore, signaling overheads of configuration information transmission are relatively low, so that a problem of relatively high signaling overheads in a related technology is resolved, thereby achieving an effect of reducing signaling overheads.

Figure 8:
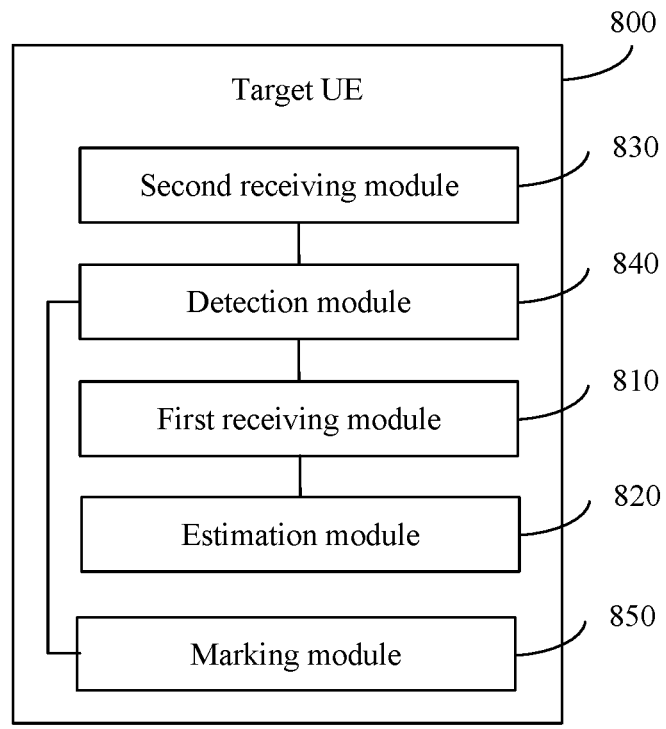
FIG. 8 is a block diagram of another target UE according to an embodiment of the present invention.

Referring to FIG. 8, FIG. 8 shows a block diagram of another target UE-800 according to an embodiment of the present invention. The target UE-800 may be the UE in the target group in the implementation environment shown in FIG. 1, and is configured to perform some method steps provided in the embodiment shown in FIG. 4A and FIG. 4B and all method steps provided in the embodiment shown in FIG. 3. Referring to FIG. 8, the target UE-800 may include:

a first receiving module 810, configured to receive, in a first preset time-frequency resource area, configuration information sent by a base station, where the configuration information is sent, in the first preset time-frequency resource area, to UE in a target group after the base station determines configuration information corresponding to the target group, the target group includes at least two UEs, the configuration information is used to indicate a channel state information-reference signal CSI-RS configuration of the UE in the target group, CSI-RS configurations of all UEs in the target group are the same, and the target UE belongs to the target group; and an estimation module 820, configured to: receive a CSI-RS based on the configuration information, and perform channel estimation based on the received CSI-RS.

Optionally, the first preset time-frequency resource area is on a physical downlink shared channel PDSCH, and the target UE-800 further includes: a second receiving module 830, configured to receive radio resource control RRC signaling sent by the base station, where the RRC signaling carries a channel state information CSI radio network temporary identifier RNTI of the target group; and a detection module 840, configured to detect, based on the CSI-RNTI of the target group in a second preset time-frequency resource area on a physical downlink control channel PDCCH, scrambled indication information sent by the base station, where the scrambled indication information is obtained by using the CSI-RNTI of the target group to scramble indication information after the base station determines the indication information, and the indication information is used to indicate a location of the first preset time-frequency resource area on the PDSCH.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the detection module 840 is configured to detect the scrambled indication information based on the CSI-RNTI of the target group in the second preset time-frequency resource area in a target time period, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the target UE-800 further includes: a marking module 850, configured to: after detection succeeds, mark the CSI-RNTI of the target group by using an invalid mark, where the invalid mark is used to indicate that the CSI-RNTI of the target group is invalid.

In conclusion, according to the target UE provided in this embodiment of the present invention, the target UE receives, in the first preset time-frequency resource area, the configuration information sent by the base station, receives the CSI-RS based on the configuration information, and performs the channel estimation based on the received CSI-RS. The configuration information is sent, in the first preset time-frequency resource area, to the UE in the target group after the base station determines the configuration information corresponding to the target group, and the target UE belongs to the target group. The configuration information is sent, in the first preset time-frequency resource area, to the UE in the target group by the base station. Therefore, signaling overheads of configuration information transmission are relatively low, so that a problem of relatively high signaling overheads in a related technology is resolved, thereby achieving an effect of reducing signaling overheads.

It should be noted that when the configuration information transmission apparatuses (including the base station and the target UE) provided in the foregoing embodiments transmit configuration information, division of the foregoing functional modules is used only as an example for description. In actual application, the foregoing functions may be allocated to different functional modules for implementation as required, that is, an internal structure of a device is divided into different functional modules for implementing all or some of the functions described above. In addition, the configuration information transmission apparatuses provided in the foregoing embodiments and the configuration information transmission method embodiments pertain to a same concept. For a specific implementation process of the configuration information transmission apparatuses, refer to the method embodiments. Details are not described herein again.

Figure 9:
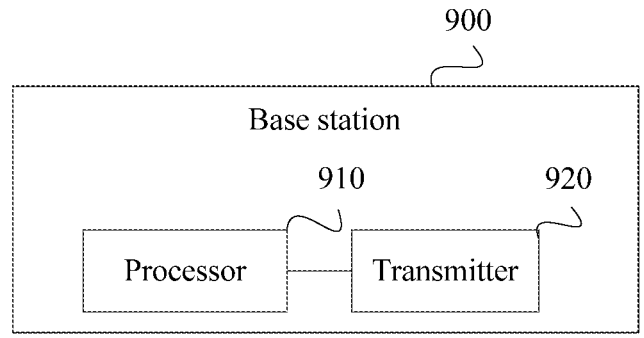
FIG. 9 is a block diagram of a base station according to an embodiment of the present invention.

Referring to FIG. 9, FIG. 9 shows a block diagram of a base station 900 according to an embodiment of the present invention. The base station 900 may be the base station 01 in the implementation environment shown in FIG. 1, and is configured to perform some method steps provided in the embodiment shown in FIG. 4A and FIG. 4B and all method steps provided in the embodiment shown in FIG. 2. Referring to FIG. 9, the base station 900 may include a processor 910 and a transmitter 920, and the processor 910 is coupled to the transmitter 920.

The processor 910 is configured to determine configuration information corresponding to a target group, where the configuration information is used to indicate a channel state information-reference signal CSI-RS configuration of user equipment UE in the target group, the target group includes at least two UEs, and CSI-RS configurations of all UEs in the target group are the same.

The transmitter 920 is configured to send, in a first preset time-frequency resource area, the configuration information to the UE in the target group.

In conclusion, according to the base station provided in this embodiment of the present invention, the base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

Optionally, the first preset time-frequency resource area is on a physical downlink shared channel PDSCH, and the processor 910 is further configured to:

determine indication information, where the indication information is used to indicate a location of the first preset time-frequency resource area on the PDSCH;

obtain a channel state information CSI radio network temporary identifier RNTI of the target group; and scramble the indication information by using the CSI-RNTI of the target group.

The transmitter 920 is further configured to send, in a second preset time-frequency resource area on a physical downlink control channel PDCCH, scrambled indication information to the UE in the target group.

Optionally, the transmitter 920 is further configured to add the CSI-RNTI of the target group to radio resource control RRC signaling, and send the radio resource control RRC signaling to the UE in the target group.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the transmitter 920 is further configured to send, in the second preset time-frequency resource area in a target time period, the scrambled indication information to the UE in the target group, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the processor 910 is further configured to determine search space that includes a plurality of preset control channel elements CCEs on the PDCCH as the group search space.

In conclusion, according to the base station provided in this embodiment of the present invention, the base station sends, in the first preset time-frequency resource area, the configuration information to the UE in the target group. Therefore, signaling overheads of configuration information transmission are relatively low, so that a problem of relatively high signaling overheads in a related technology is resolved, thereby achieving an effect of reducing signaling overheads.

Figure 10:
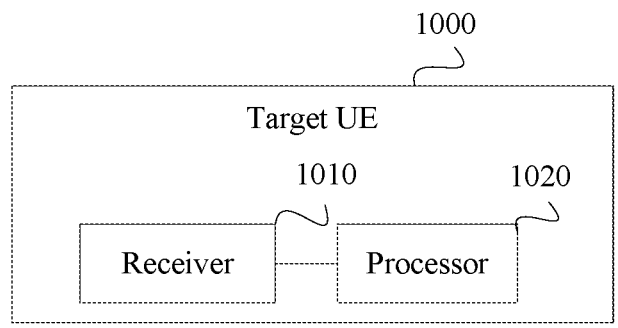
FIG. 10 is a block diagram of target UE according to an embodiment of the present invention.

Referring to FIG. 10, FIG. 10 shows a block diagram of target UE 1000 according to an embodiment of the present invention. The target UE 1000 may be the UE in the target group in the implementation environment shown in FIG. 1, and is configured to perform some method steps provided in the embodiment shown in FIG. 4A and FIG. 4B and all method steps provided in the embodiment shown in FIG. 3. Referring to FIG. 10, the target UE 1000 may include a receiver 1010 and a processor 1020.

The receiver 1010 is configured to receive, in a first preset time-frequency resource area, configuration information sent by a base station, where the configuration information is sent, in the first preset time-frequency resource area, to UE in a target group after the base station determines configuration information corresponding to the target group, the target group includes at least two UEs, the configuration information is used to indicate a channel state information-reference signal CSI-RS configuration of the UE in the target group, CSI-RS configurations of all UEs in the target group are the same, and the target UE belongs to the target group.

The processor 1020 is configured to: receive a CSI-RS based on the configuration information, and perform channel estimation based on the received CSI-RS.

In conclusion, according to the target UE provided in this embodiment of the present invention, the target UE receives, in the first preset time-frequency resource area, the configuration information sent by the base station, receives the CSI-RS based on the configuration information, and performs the channel estimation based on the CSI-RS. The configuration information is sent, in the first preset time-frequency resource area, to the UE in the target group after the base station determines the configuration information corresponding to the target group, and the target UE belongs to the target group. The configuration information is sent, in the first preset time-frequency resource area, to the UE in the target group by the base station. Therefore, signaling overheads of configuration information transmission are relatively low, so that a problem of relatively high signaling overheads in a related technology is resolved, thereby achieving an effect of reducing signaling overheads.

Optionally, the first preset time-frequency resource area is on a physical downlink shared channel PDSCH, and the receiver 1010 is further configured to receive radio resource control RRC signaling sent by the base station, where the RRC signaling carries a channel state information CSI radio network temporary identifier RNTI of the target group.

The processor 1020 is configured to detect, based on the CSI-RNTI of the target group in a second preset time-frequency resource area on a physical downlink control channel PDCCH, scrambled indication information sent by the base station, where the scrambled indication information is obtained by using the CSI-RNTI of the target group to scramble indication information after the base station determines the indication information, and the indication information is used to indicate a location of the first preset time-frequency resource area on the PDSCH.

Optionally, a group served by the base station includes m groups, where m is an integer greater than or equal to 1, and the target group is any one of the m groups; CSI-RNTIs of any two groups in the m groups are different; or CSI-RNTIs of all groups in the m groups are the same.

When the CSI-RNTIs of all the groups in the m groups are the same, scrambled indication information corresponding to all the groups in the m groups is sent at different time, and the processor 1020 is further configured to detect the scrambled indication information based on the CSI-RNTI of the target group in the second preset time-frequency resource area in a target time period, where the target time period is corresponding to the target group.

Optionally, the second preset time-frequency resource area is a time-frequency resource area in common search space. The common search space is search space that is on the PDCCH and that is used to carry common downlink control information DCI sent by the base station.

Optionally, the second preset time-frequency resource area is a time-frequency resource area in group search space, and the group search space is search space that is on the PDCCH and that is used to carry downlink control information DCI sent by the base station to a group.

Optionally, the processor 1020 is further configured to: after detection succeeds, mark the CSI-RNTI of the target group by using an invalid mark, where the invalid mark is used to indicate that the CSI-RNTI of the target group is invalid.

In conclusion, according to the target UE provided in this embodiment of the present invention, the target UE receives, in the first preset time-frequency resource area, the configuration information sent by the base station, receives the CSI-RS based on the configuration information, and performs the channel estimation based on the CSI-RS. The configuration information is sent, in the first preset time-frequency resource area, to the UE in the target group after the base station determines the configuration information corresponding to the target group, and the target UE belongs to the target group. The configuration information is sent, in the first preset time-frequency resource area, to the UE in the target group by the base station. Therefore, signaling overheads of configuration information transmission are relatively low, so that a problem of relatively high signaling overheads in a related technology is resolved, thereby achieving an effect of reducing signaling overheads.

Figure 11:
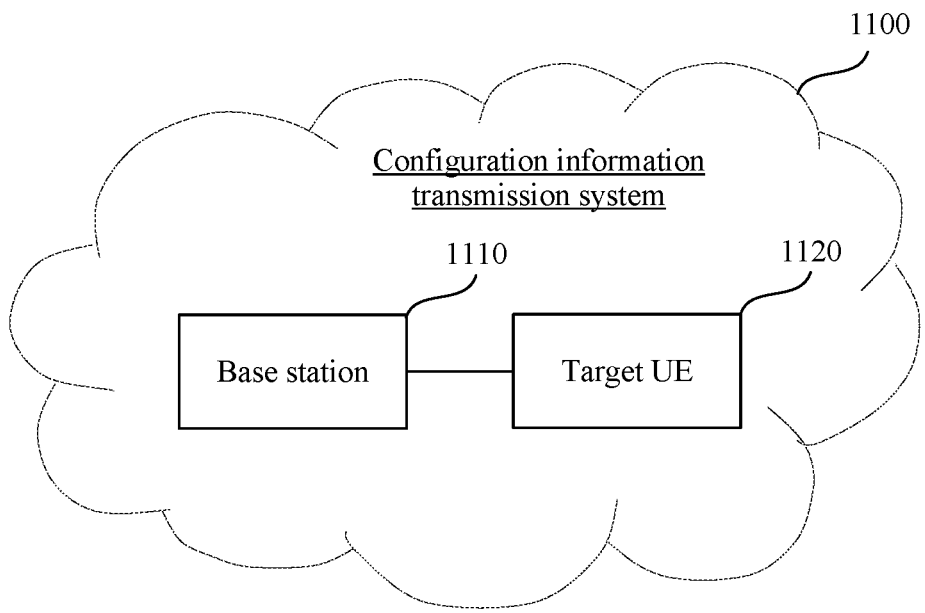
FIG. 11 is a schematic structural diagram of a configuration information transmission system according to an embodiment of the present invention.

Referring to FIG. 11, FIG. 11 shows a schematic structural diagram of a configuration information transmission system 1100 according to an embodiment of the present invention. Referring to FIG. 11, the configuration information transmission system 1100 may include a base station 1110 and target UE-1120.

In a possible implementation, the base station 1110 is the base station shown in FIG. 5 or FIG. 6, and the target UE-1120 is the target UE shown in FIG. 7 or FIG. 8.

In a possible implementation, the base station 1110 is the base station shown in FIG. 9, and the target UE-1120 is the target UE shown in FIG. 10.

In conclusion, according to the configuration information transmission system provided in this embodiment of the present invention, the base station sends, in a first preset time-frequency resource area, configuration information to UE in a target group. Therefore, signaling overheads of configuration information transmission are relatively low, so that a problem of relatively high signaling overheads in a related technology is resolved, thereby achieving an effect of reducing signaling overheads.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method of configuration information transmission, comprising:
    determining, by a base station, configuration information corresponding to a target group, wherein the configuration information is used to indicate a channel state information-reference signal CSI-RS configuration of user equipment UE in the target group, the target group comprises at least two UEs, and CSI-RS configurations of all UEs in the target group are the same; and
    sending, by the base station in a first preset time-frequency resource area, the configuration information to the UE in the target group, and wherein the first preset time-frequency resource area is on a physical downlink shared channel PDSCH; and
    before sending, by the base station in a first preset time-frequency resource area, the configuration information to the UE in the target group, the method further comprises:
    determining, by the base station, indication information, wherein the indication information is used to indicate a location of the first preset time-frequency resource area on the PDSCH;
    obtaining, by the base station, a channel state information CSI radio network temporary identifier RNTI of the target group;

scrambling, by the base station, the indication information by using the CSI-RNTI of the target group; and sending, by the base station in a second preset time-frequency resource area on a physical downlink control channel PDCCH, scrambled indication information to the UE in the target group, wherein a group served by the base station comprises m groups, wherein m is an integer greater than or equal to 1, and the target group is any one of the m groups;

CSI-RNTIs of any two groups in the m groups are different; or CSI-RNTIs of all groups in the m groups are the same; and when the CSI-RNTIs of all the groups in the m groups are the same, scrambled indication information corresponding to all the groups in the m groups is sent at different time, and the sending, by the base station in a second preset time-frequency resource area on a physical downlink control channel PDCCH, scrambled indication information to the UE in the target group comprises:

sending, by the base station in the second preset time-frequency resource area in a target time period, the scrambled indication information to the UE in the target group, wherein the target time period is corresponding to the target group.

2. The method according to claim 1, wherein before sending, by the base station in a second preset time-frequency resource area on a physical downlink control channel PDCCH, scrambled indication information to the UE in the target group, the method further comprises:

adding, by the base station, the CSI-RNTI of the target group to radio resource control RRC signaling, and sending the radio resource control RRC signaling to the UE in the target group.

3. The method according to claim 1, wherein the second preset time-frequency resource area is a time-frequency resource area in common search space.

4. The method according to claim 1, wherein the second preset time-frequency resource area is a time-frequency resource area in group search space, and the group search space is search space that is on the PDCCH and that is used to carry downlink control information DCI sent by the base station to a group.

5. A method of configuration transmission, comprising:

receiving, by target user equipment UE in a first preset time-frequency resource area, configuration information sent by a base station, wherein the configuration information is sent, in the first preset time-frequency resource area, to UE in a target group after the base station determines configuration information corresponding to the target group, the target group comprises at least two UEs, the configuration information is used to indicate a channel state information-reference signal CSI-RS configuration of the UE in the target group, CSI-RS configurations of all UEs in the target group are the same, and the target UE belongs to the target group; and receiving, by the target UE, a CSI-RS based on the configuration information, and performing channel estimation based on the received CSI-RS; and, wherein the first preset time-frequency resource area is on a physical downlink shared channel PDSCH, and before the receiving, by target UE in a first preset time-frequency resource area, configuration information sent by a base station, the method further comprises:

receiving, by the target UE, radio resource control RRC signaling sent by the base station, wherein the RRC signaling carries a channel state information CSI radio network temporary identifier RNTI of the target group; and detecting, by the target UE based on the CSI-RNTI of the target group in a second preset time-frequency resource area on a physical downlink control channel PDCCH, scrambled indication information sent by the base station, wherein the scrambled indication information is obtained by using the CSI-RNTI of the target group to scramble indication information after the base station determines the indication information, and the indication information is used to indicate a location of the first preset time-frequency resource area on the PDSCH, wherein a group served by the base station comprises m groups, wherein m is an integer greater than or equal to 1, and the target group is any one of the m groups;

CSI-RNTIs of any two groups in the m groups are different; or CSI-RNTIs of all groups in the m groups are the same; and when the CSI-RNTIs of all the groups in the m groups are the same, scrambled indication information corresponding to all the groups in the m groups is sent at different time, and the detecting, by the target UE based on the CSI-RNTI of the target group in a second preset time-frequency resource area on a physical downlink control channel PDCCH, scrambled indication information sent by the base station comprises:

detecting, by the target UE, the scrambled indication information based on the CSI-RNTI of the target group in the second preset time-frequency resource area in a target time period, wherein the target time period is corresponding to the target group.

6. The method according to claim 5, wherein the second preset time-frequency resource area is a time-frequency resource area in common search space.

7. The method according to claim 5, wherein the second preset time-frequency resource area is a time-frequency resource area in group search space, and the group search space is search space that is on the PDCCH and that is used to carry downlink control information DCI sent by the base station to a group.

8. The method according to claim 5, wherein after the detecting, by the target UE, the scrambled indication information based on the CSI-RNTI of the target group in the second preset time-frequency resource area in a target time period, the method further comprises:

marking, by the target UE after detection succeeds, the CSI-RNTI of the target group by using an invalid mark, wherein the invalid mark is used to indicate that the CSI-RNTI of the target group is invalid.

9. A base station comprising:

a processor configured to determine configuration information corresponding to a target group, wherein the configuration information is used to indicate a channel state information-reference signal CSI-RS configuration of user equipment UE in the target group, the target group comprises at least two UEs, and CSI-RS configurations of all UEs in the target group are the same; and a transmitter coupled to the processor and configured to send, in a first preset time-frequency resource area, the configuration information to the UE in the target group, wherein the first preset time-frequency resource area is on a physical downlink shared channel PDSCH;

the processor is further configured to: determine indication information, wherein the indication information is used to indicate a location of the first preset time-frequency resource area on the PDSCH; obtain a channel state information CSI radio network temporary identifier RNTI of the target group; and scramble the indication information by using the CSI-RNTI of the target group; and the transmitter is further configured to send, in a second preset time-frequency resource area on a physical downlink control channel PDCCH, scrambled indication information to the UE in the target group, wherein a group served by the base station comprises m groups, wherein m is an integer greater than or equal to 1, and the target group is any one of the m groups;

CSI-RNTIs of any two groups in the m groups are different; or CSI-RNTIs of all groups in the m groups are the same; and when the CSI-RNTIs of all the groups in the m groups are the same, scrambled indication information corresponding to all the groups in the m groups is sent at different time, and the transmitter is further configured to send, in the second preset time-frequency resource area in a target time period, the scrambled indication information to the UE in the target group, wherein the target time period is corresponding to the target group.

10. The base station according to claim 9, wherein transmitter is further configured to add the CSI-RNTI of the target group to radio resource control RRC signaling, and send the radio resource control RRC signaling to the UE in the target group.

11. Target user equipment UE comprising:
a receiver configured to receive, in a first preset time-frequency resource area, configuration information sent by a base station, wherein the configuration information is sent, in the first preset time-frequency resource area, to UE in a target group after the base station determines configuration information corresponding to the target group, the target group comprises at least two UEs, the configuration information is used to indicate a channel state information-reference signal CSI-RS configuration of the UE in the target group, CSI-RS configurations of all UEs in the target group are the same, and the target UE belongs to the target group; and a processor coupled to the receiver and configured to: receive a CSI-RS based on the configuration information, and perform channel estimation based on the received CSI-RS, wherein the first preset time-frequency resource area is on a physical downlink shared channel PDSCH;

the receiver is further configured to receive radio resource control RRC signaling sent by the base station, wherein the RRC signaling carries a channel state information CSI radio network temporary identifier RNTI of the target group; and the processor is configured to detect, based on the CSI-RNTI of the target group in a second preset time-frequency resource area on a physical downlink control channel PDCCH, scrambled indication information sent by the base station, wherein the scrambled indication information is obtained by using the CSI-RNTI of the target group to scramble indication information after the base station determines the indication information, and the indication information is used to indicate a location of the first preset time-frequency resource area on the PDSCH, wherein a group served by the base station comprises m groups, wherein m is an integer greater than or equal to 1, and the target group is any one of the m groups;

CSI-RNTIs of any two groups in the m groups are different; or CSI-RNTIs of all groups in the m groups are the same; and when the CSI-RNTIs of all the groups in the m groups are the same, scrambled indication information corresponding to all the groups in the m groups is sent at different time, and the processor is further configured to detect the scrambled indication information based on the CSI-RNTI of the target group in the second preset time-frequency resource area in a target time period, wherein the target time period is corresponding to the target group.

12. The target UE according to claim 11, wherein the second preset time-frequency resource area is a time-frequency resource in common search space.

* * * * *